US006379110B1

(12) United States Patent
McCormick et al.

(10) Patent No.: US 6,379,110 B1
(45) Date of Patent: Apr. 30, 2002

(54) PASSIVELY DRIVEN ACOUSTIC JET CONTROLLING BOUNDARY LAYERS

(75) Inventors: Duane C. McCormick, Colchester; Wesley K. Lord, South Glastonbury, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/257,563

(22) Filed: Feb. 25, 1999

(51) Int. Cl.$^7$ ............................................. F01D 25/04
(52) U.S. Cl. ..................... 415/119; 415/914; 415/115; 415/173.1
(58) Field of Search ................................. 415/119, 914, 415/11, 57.1, 57.4, 57.3, 58.5, 58.7, 168.2, 168.4, 173.1, 36, 37, 115, 203; 244/208

(56) References Cited

U.S. PATENT DOCUMENTS

| 3,774,867 | A | | 11/1973 | Quinn ........................ 244/40 R |
| 4,697,769 | A | | 10/1987 | Blackwelder et al. ........ 244/199 |
| 5,209,438 | A | | 5/1993 | Wygnanski .................. 244/203 |
| 5,256,031 | A | | 10/1993 | Bothien et al. ................. 415/1 |
| 5,308,225 | A | * | 5/1994 | Koff et al. .................. 415/57.3 |
| 5,382,134 | A | | 1/1995 | Pla et al. ...................... 415/119 |
| 5,458,457 | A | * | 10/1995 | Goto et al. .................. 415/115 |
| 5,758,823 | A | | 6/1998 | Glezer et al. ................... 239/4 |
| 6,244,817 | B1 | * | 6/2001 | Ngo ............................ 415/119 |

FOREIGN PATENT DOCUMENTS

| DE | 4333865 | | 2/1995 |
| DE | 19735269 | | 1/1999 |
| EP | 0039459 | | 11/1981 |
| JP | 07-332284 | * | 12/1995 |

OTHER PUBLICATIONS

Wygnanski, I., & Seifert, A., "The Control of Separation by Periodic Oscillations", 18th AIAA Aerospace Ground Testing Conference, Colorado Springs, CO, Jun. 20–23, 1994.

Amitay, M., Smith, B.L., & Glezer, A., "Aerodynamic Flow Control Using Synthetic Jet Technology", AIAA Paper No. 98–0208, 36th Aerospace Sciences Meeting & Exhibit, Reno, NV, Jan. 12–15, 1998.

Smith, D., Amitay, M., Kibens, V., Parekh, D., & Glezer, A., "Modification of Lifting Body Aerodynamics Using Synthetic Jet Actuators", AIAA Paper No. 98–0209, 36th Aerospace Sciences Meeting & Exhibit, Reno, NV, Jan. 12–15, 1998.

Seifert, A. & Pack, L.G., "Oscillatory Control of Separation at High Reynolds Numbers", AIAA Paper No. 98–0214, 36th Aerospace Sciences Meeting & Exhibit, Reno, NV, Jan. 12–15, 1998.

Rediniotis, O.K., Ko, J., Yue, X. & Kurdila, A.J., "Synthetic Jets, Their Reduced Order Modeling and Applications to Flow Control", AIAA Paper No. 99–1000, 37th Aerospace Sciences Meeting & Exhibit, Reno, NV, Jan. 12–15, 1999.

PCT International Appl. No. 00/05016, International Search Report, Jul. 13, 2000, pp. 1–3.

* cited by examiner

Primary Examiner—Edward K. Look
Assistant Examiner—Richard Woo (57) ABSTRACT

Existing pressure oscillations created by axial or centrifugal fans in a diverging shroud are utilized to power a passive, acoustic jet, the nozzle of which directs high momentum flux gas particles essentially tangentially into the boundary layer of the flow in a diffuser, or a duct, the fluid particles in the resonant chamber of the passive acoustic jet being replenished with low momentum flux particles drawn from the fluid flow in a direction normal to the surface, thereby to provide a net time averaged flow of increased momentum flux particles to defer, even eliminate, the onset of boundary layer separation in the diffuser or duct. The passive acoustic jet is used in the vicinity of fan blade tips to alleviate undesirable flow effects in the tip region, such as leakage.

26 Claims, 7 Drawing Sheets

PASSIVELY DRIVEN ACOUSTIC JET CONTROLLING BOUNDARY LAYERS

CROSS REFERENCE TO RELATED APPLICATION AND PATENT

Commonly owned U.S. patent application[s filed contemporaneously herewith, Ser. No. 09/257,565 and U.S. Pat. Nos. 6,203,269 and 6,109,566 contain subject matter related to that disclosed and claimed herein.

TECHNICAL FIELD

This invention relates to use of ambient noise to drive a resonant, passive acoustic jet having a nozzle directed, preferably essentially tangentially, into the flow of a fluid to energize the boundary layer thereof.

BACKGROUND ART

Fluid flow in the boundary layer adjacent to a surface exhibits a reduction in velocity due to friction of the molecular viscosity interacting with the surface, which results in a strong velocity gradient as a function of perpendicular distance from the wall: essentially zero at the surface, raising to mainstream velocity at the outer edge of the boundary layer. The reduced velocity results in a lower momentum flux, which is the product of the density of the fluid times the square of its velocity. This near-wall, low-momentum fluid can be problematic for the case where the static pressure rises along the direction of the flow. For example, along a diverging surface (that is, a surface that tails away from the mean flow direction), as is the case in a diffuser, on the suction side of an airfoil such as a fan blade or an airplane wing, the flow along the surface is accompanied by a pressure rise, which is accomplished only by conversion of momentum flux. If the pressure rise is sufficiently large, the momentum and energy of the fluid along the surface is consumed in overcoming this pressure rise, so that the fluid particles are finally brought to rest and then flow begins to break away from the wall, resulting in boundary layer separation. Boundary layer separation typically results in the termination of pressure rise (recovery) and hence loss in performance (e.g., airfoil lift) and dramatic decrease in system efficiency, due to conversion of flow energy into turbulence, and eventually into heat. It is known that boundary layer separation can be deterred by increasing the momentum flux of the fluid particles flowing near the surface. In the art, the deterrence or elimination of boundary layer separation is typically referred to as "delaying the onset of boundary layer separation".

The simplest and most common method for overcoming boundary layer separation includes small vortex generators, which may typically be tabs extending outwardly from the surface (such as the upper surface of an airplane wing), which shed an array of streamwise vortices along the surface. The vortices transport the low momentum particles (that are flowing near the surface upstream) away from the surface downstream, and transport the higher momentum particles (that are flowing at a distance from the surface upstream) toward the surface downstream, thereby improving the momentum flux of particles flowing near the surface in the boundary layer. This has the effect of deterring boundary layer separation at any given velocity and over a range of angle of attack (where the uncontrolled separation is downstream of the vortex generators). However, as is known, tab-type vortex generators create parasitic drag which limits the degree of boundary layer separation which can be efficiently/practically suppressed.

Another known approach employs continuous flow into or out of the boundary layer. A wall suction upstream of the boundary separation line (that is the line at which the onset of full boundary layer separation occurs across the surface of an airfoil or a diffuser) simply removes low momentum flux fluid particles from the flow adjacent to the surface, the void created thereby being filled by higher momentum flux particles drawn in from the flow further out from the surface. A similar approach is simply blowing high energy fluid tangentially in the downstream direction through a slot to directly energize the flow adjacent to the surface. Both of these flow techniques, however, require a source of vacuum or a source of pressure and internal piping from the source to the orifices at the surface. This greatly increases the cost, weight and complexity of any such system, and have not as yet been found to be sufficiently effective to merit further use, over a wide range of applications.

A relatively recent, so-called "dynamic separation control" uses perturbations oscillating near the surface, just ahead of the separation point, as are illustrated in U.S. Pat. No. 5,209,438. These include: pivotal flaps which oscillate from being flush with the surface to having a downstream edge thereof extending out from the surface; ribbons parallel to the surface, the mean position of which is oscillated between being within the surface and extending outwardly into the flow; perpendicular obstructions that oscillate in and out of the flow; and rotating vanes (microturbines) that provide periodic obstruction to the flow, and oscillatory blowing. These devices introduce a periodic disturbance in vorticity to the flow, the vortices being amplified in the unstable separating shear layer into large, spanwise vortical structures which convect high momentum flow toward the surface, thereby enabling pressure recovery. Such a flow is neither attached nor separated, under traditional definitions.

However, such perturbations must be actively controlled as a function of all of the flow and geometric parameters, dynamically, requiring expensive modeling of complex unsteady flow structures and/or significant testing to provide information for adapting to flow changes either through open loop scheduling or in response to feedback from sensors in the flow.

A recent variation on the dynamic separation control is the utilization of a so-called "synthetic" jet (also referred to as "acoustic jet" or "streaming" ) directed perpendicular to the surface upstream of the boundary separation line of the surface. This approach has been reported as being highly parameter dependent, thus also requiring dynamic control; and, the results achieved to date have not been sufficient to merit the cost and complexity thereof.

A totally different boundary layer problem manifests itself in a variety of applications, an important one of which is the inlet fan of an aircraft turbocompressor. At the tip of the blades, there is a phenomena called blade tip leakage through the clearance between the blade tips and the adjacent wall. The power loss as a consequence of blade tip leakage is significant, but the problem has not been solved in a practical way.

DISCLOSURE OF INVENTION

Objects of the invention include improved boundary layer flow, improved deterrence of fluid flow boundary layer separation, reduced noise in fluid flow machinery, increased efficiency of fluid flow machinery, reduced blade tip leakage, boundary layer control which is effective, efficient, having low initial cost and zero operating costs, and boundary layer control which is relatively simple and provides little parasitic impact on the host structures and systems.

This invention is predicated in part on the fact that the outflowing jet stream of an acoustic jet will clear the orifice or nozzle area sufficiently before the onset of negative pressure, which therefore will cause replenishment of gas particles within the jet cavity with particles which are other than those in the emitted jet stream. This invention is also predicated in part on our discovery that an acoustic jet directed tangentially into a boundary layer of a gas flow will produce a net negative flow averaged over time which is generally perpendicular to the surface and a net positive flow averaged over time which is generally parallel to the surface.

According to the present invention, an acoustic jet directed into the boundary layer of fluid flow (such as air) is passively powered by ambient, fluid-borne acoustics. The nozzle/chamber combination of the jet has significant resonance at a band of frequencies including frequencies of significant energy in the noise or other pressure variations within the fluid flow so as to produce a nozzle velocity of sufficient intensity to control the boundary layer. The nozzle of the jet preferably is directed at a low angle of incidence to the boundary layer. In one application of the invention, the acoustic jet is directed at a low angle of incidence in the vicinity of the boundary layer separation point of a diffuser thereby to deter or prevent boundary layer separation. In further accord with the invention, the jet may be located at the entrance to a diffuser to deter or prevent boundary layer separation. In another application, the jet is directed from a shroud toward the tips of an axial fan to reduce the size of the boundary layer and mitigate blade tip/wall inefficiencies.

The negative pressure portion of the acoustic jet cycle creates a flow of low momentum flux gas particles perpendicular to the surface, entering the chamber, thereby removing low momentum flux fluid particles from the approaching boundary layer, such particles having energy imparted thereto through acoustic resonance with high energy pressure components in the gas flow, the energized fluid particles, having higher momentum flux, being injected, preferably essentially tangentially, into the boundary layer, either to provide adequate momentum flux in the boundary layer, thereby to deter the onset of boundary layer separation downstream thereof, or to reduce the size of a boundary layer, such as to thereby mitigate blade tip/wall effects of a fan. Use of the noise energy may result in a quieter system, in some cases, by conversion of acoustic energy into gas flow.

In preferred embodiments, the nozzle is directed at as small an acute angle to the boundary layer as is practicable, referred to herein as "substantially tangential"; the angle may range from near zero degrees to forty or more degrees. However, the noise driven jet of the invention may be used at other angles.

The invention may be practiced utilizing resonant cavities with fixed walls in which the forcing energy is applied through the neck of the jet. The invention may also be practiced utilizing cavities with flexible walls, where the forcing energy can be applied at a point which is remote from the neck and orifice of the jet; this allows locating the flexible wall adjacent to maximal pressure variations for forcing the jet, while locating the neck and orifice at the point which will provide the maximal desired effect on the boundary layer.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
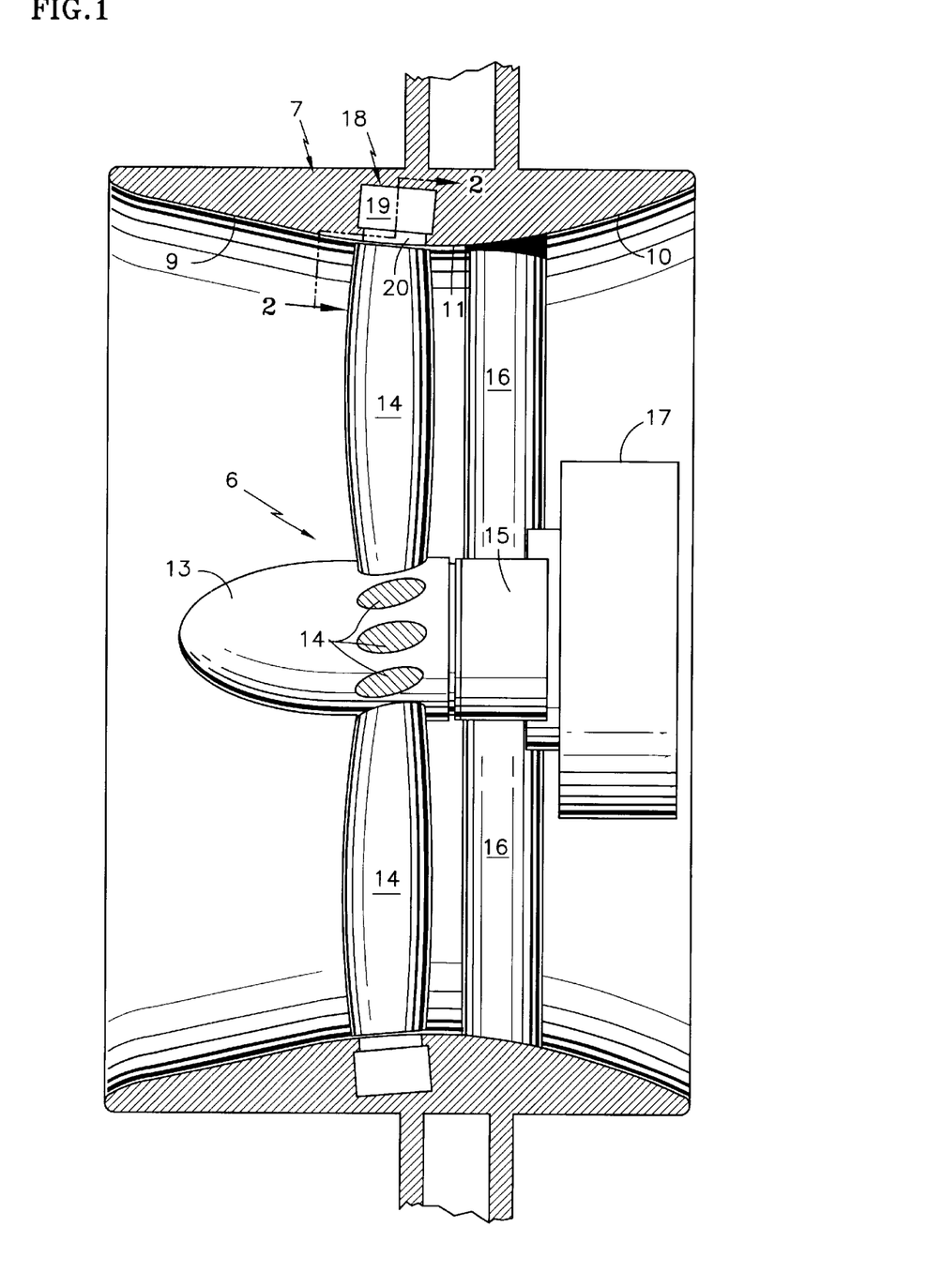
FIG. 1 is a partial, stylized, partially sectioned side elevation view of an axial fan feeding a diffuser, with a fixed wall embodiment of the invention.

Referring to FIG. 1, one embodiment of this invention is a vane axial fan 6 disposed within an inter-plenum shroud 7 which has converging section 9 and a diverging section 10 so as to form a throat 11. The fan is conventional, having a hub 13 with a plurality of blades 14 thereon, being suitably journaled to a hub 15 supported by flow-straightening vanes 16 (only two of which are shown, although more are typically used). The fan 6 may be driven in a conventional way, such as by means of a hub-mounted motor 17 or a belt driving a pulley (not shown). The fan 6 and its drive are irrelevant to the present invention, being an example merely of an airflow system which typically has sufficient noise to operate an acoustic jet according to the present invention, with the attendant advantages of converting the noise energy into gas flow, thereby causing the flow system to operate more efficiently and in some cases more quietly.

Figure 2:
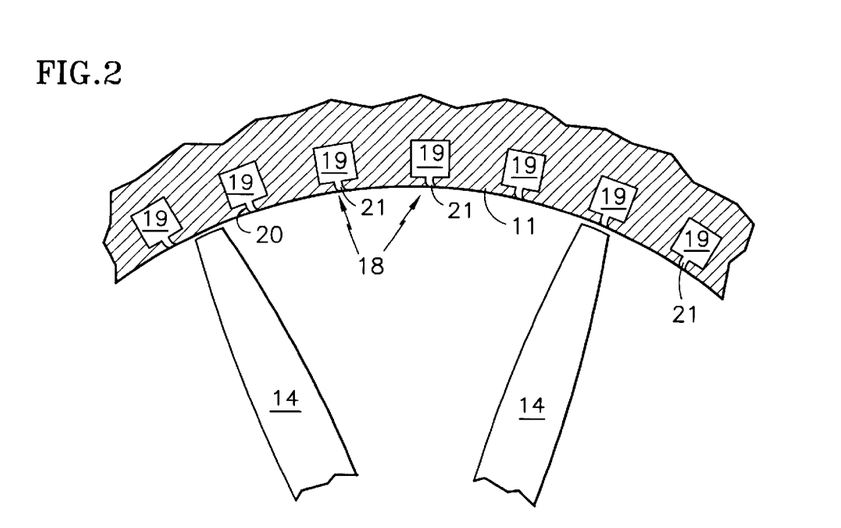
FIG. 2 is a partial, partially sectioned front elevation view taken on the line 2—2 in FIG. 1.

In accordance with the invention, a plurality of passive acoustic jets 18 each include a resonant acoustic chamber 19 formed in the shroud 7, the chambers each having a nozzle or neck 20, FIG. 2, at an extreme acute angle with respect to the surface of the throat 11, with an orifice 21 formed in the end of the neck 20 at the surface of the throat 11 opposite the tips of the blade 14.

Figure 3:
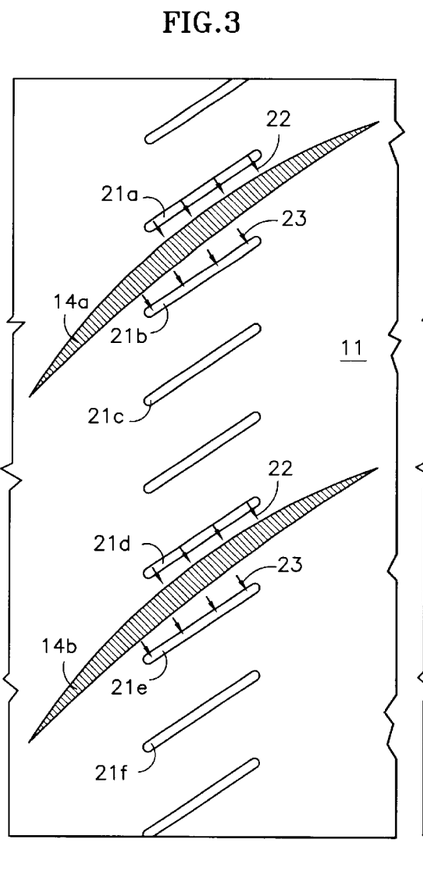
FIGS. 3 and 4 are axial developments of the fan and shroud of FIGS. 1 and 2.
Figure 4:
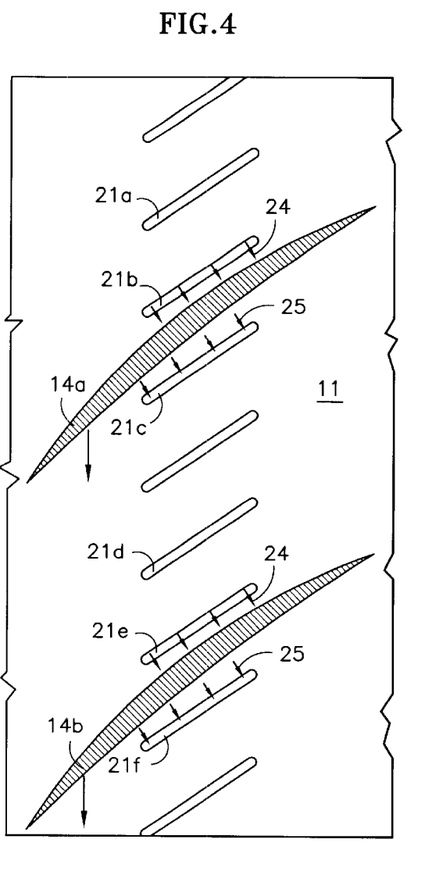

FIGS. 3 and 4 are developments of the blades 14 and shroud 11 showing the slots 21. These views are quasi-axial, with the shroud laid out in a plane, rather than being a cylindroid of some sort. Each of the acoustic jets respond to pressure loading on adjacent blades. It may be preferred to have the number of slots equal to an integer number of blades, which in this example is four slots per blade. As seen in FIG. 3, as a blade 14a passes a slot 21a, the reduction in pressure adjacent the slot 21a causes the flow to blow out of the slot, as shown by the arrows 22. Contemporaneously therewith, the increased pressure adjacent the slot 21b drives flow into the slot (and therefore the chamber 19 of the related jet) as shown by the arrows 23. Similar operation occurs with respect to a blade 14b and slots 21d and 21e. As seen in FIG. 4, as the blade 14a passes over the slot 21b, the reduced pressure now causes the flow to be outward as indicated by arrows 24, while at the same time, increased pressure over the slot 21c causes the flow to pass into the slot and the chamber 19 of the related jet 18, as indicated by arrows 25. Similar operation occurs with respect to the blade 14b and the slots 21e and 21f. In each case, the flow blowing out of the slots, as indicated by arrows 22, 24, is roughly normal to the chord of the blade at its tip, and in a direction opposite to the tip leakage. The net effect is to unload the blade tip, mitigating tip leakage, tip stall, and flutter.

Figure 5:
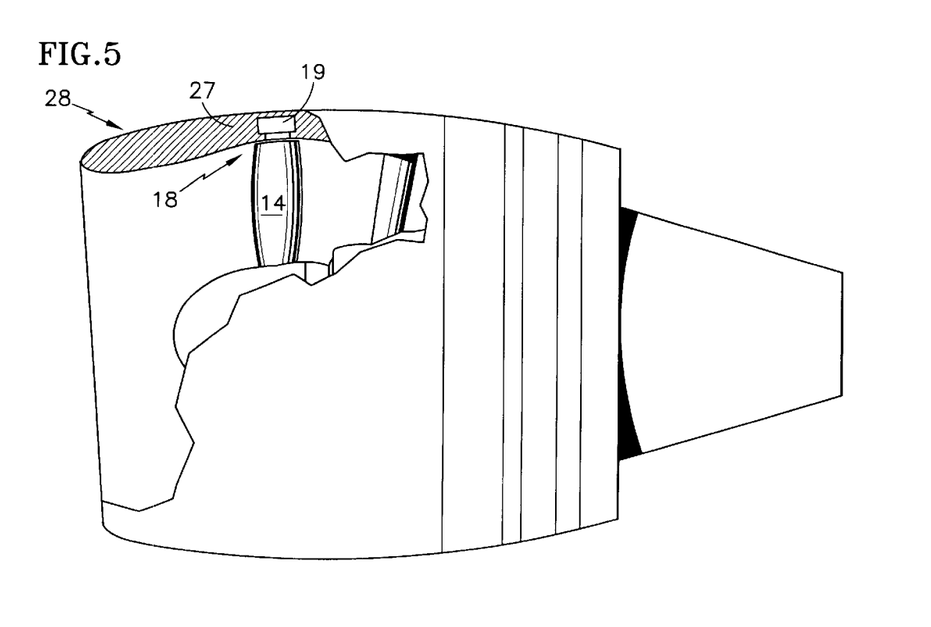
FIG. 5 is a partially broken away, partially sectioned side elevation view of a commercial jet engine employing the invention.

In FIG. 5, the acoustic jets 18 are formed within the nacelle 27 of a commercial airline jet engine 28.

Figure 6:
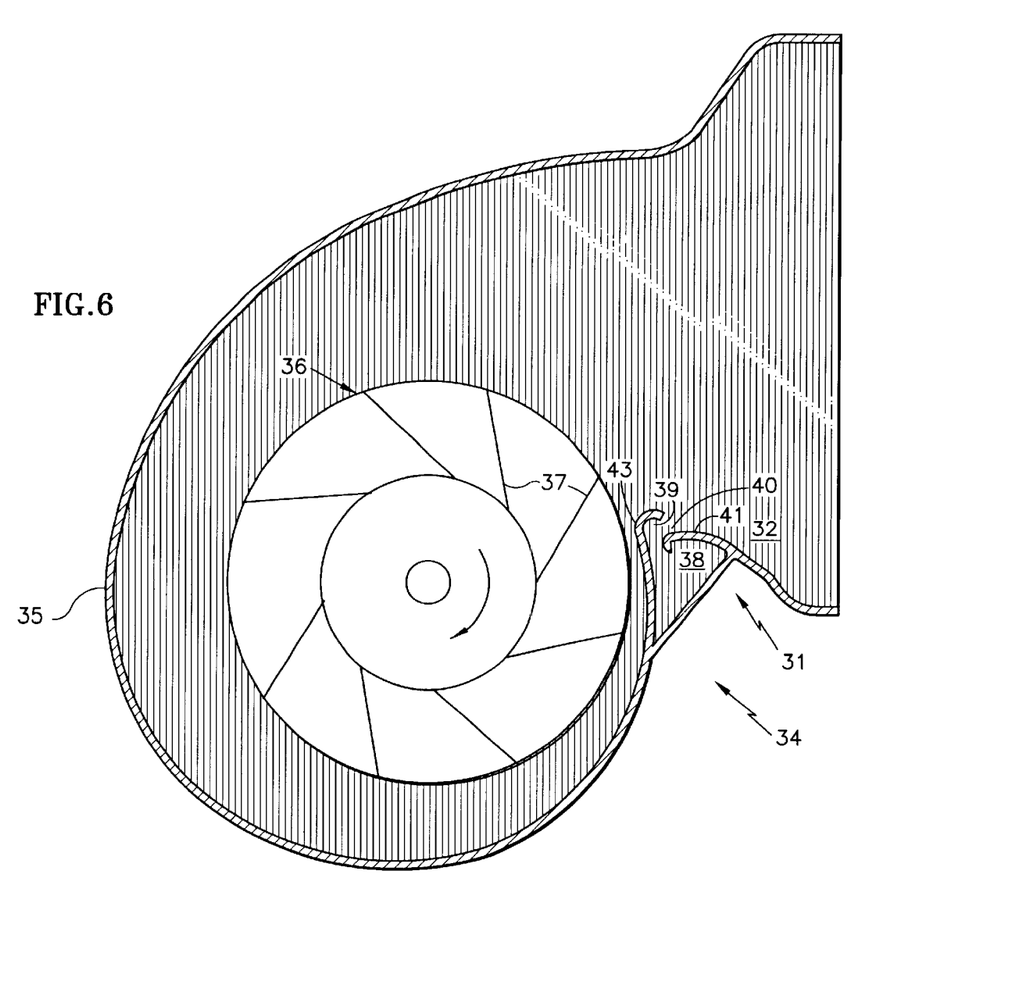
FIG. 6 is a partially sectioned, side elevation view of a centrifugal fan employing a fixed wall embodiment of the invention.

In FIG. 6, an acoustic jet 31 is embodied at the entrance to a diffuser 32 of a centrifugal fan 34 having a volute (or scroll) 35 and a rotor 36 with blades 37. In accordance with the invention, a resonant chamber 38 has a nozzle 39 feeding an orifice 40 in an adjacent surface or wall 41 of the diffuser 32. The orifice 40 is located somewhere between a point where the forcing amplitude is greatest, which is just inside the cutoff 43 and the point where boundary layer energization is most effective, which may be where the orifice 40 is shown in FIG. 2, or somewhat downstream therefrom. The energy of oscillatory pressure variations created by passage of the blades 37 past the cutoff 43 is converted into high momentum flux of the gas particles which are directed tangentially into the boundary layer at the orifice 40. In FIG. 6, the low momentum flux gas particles enter the chamber 38 during positive pressure portions of the ambient noise, the chamber 38 resonating at substantially the same frequency as the noise in the diffuser 32, so that positive pressure in the chamber 38 coincides with negative pressure in the diffuser 32 causing high momentum flux particles to pass through the nozzle 39 and along the adjacent wall of the diffuser 32. This will delay boundary layer separation, and may in fact cause the boundary layer to absolutely adhere to the adjacent surface of the diffuser 32.

Figure 7:
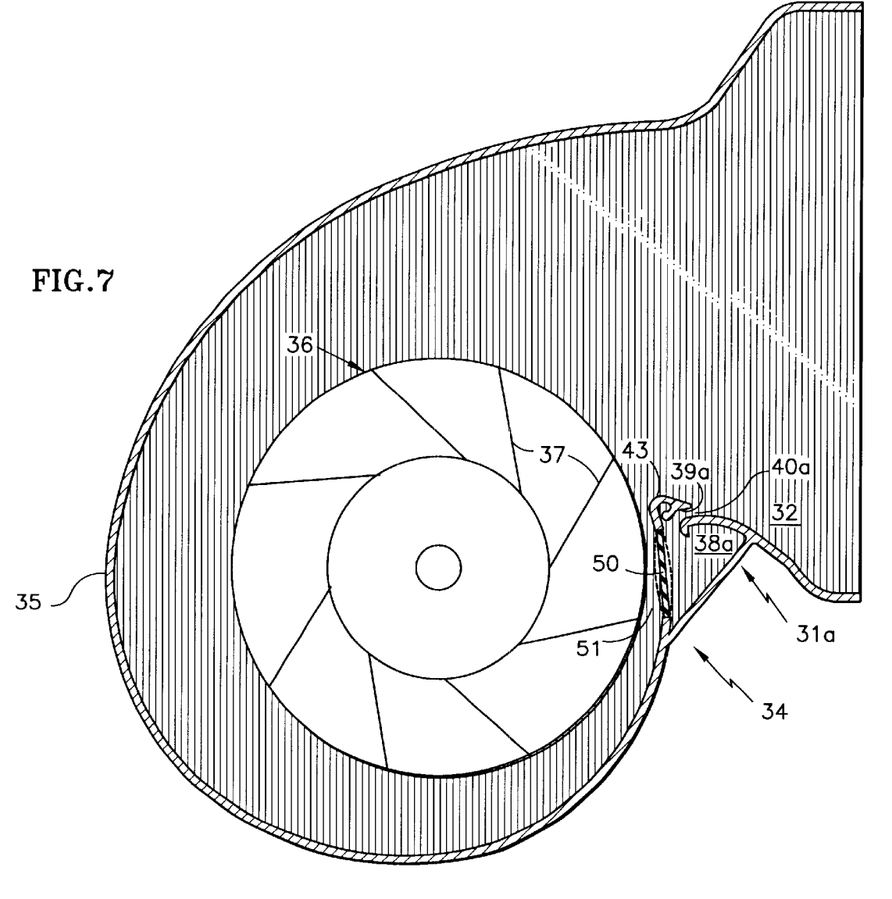
FIG. 7 is a partially sectioned, side elevation view of a centrifugal fan with a flexible wall embodiment of the invention.

A slightly different embodiment of the invention 31a shown in FIG. 6 has a chamber 38[A]a with a flexible wall 50 which can be driven to oscillate (as shown by dotted lines) in response to pressure variations in a region 51 which is downstream of the cutoff 43, where the amplitude variations can be significant. This allows the wall 50 to be disposed just past the cutoff, where the forcing amplitude is greatest. The neck 39[A]a and orifice 40a can be located where the boundary layer energization is most effective, within the diffuser 32, downstream of the cutoff, such as is shown in FIG. 7.

Figure 8:
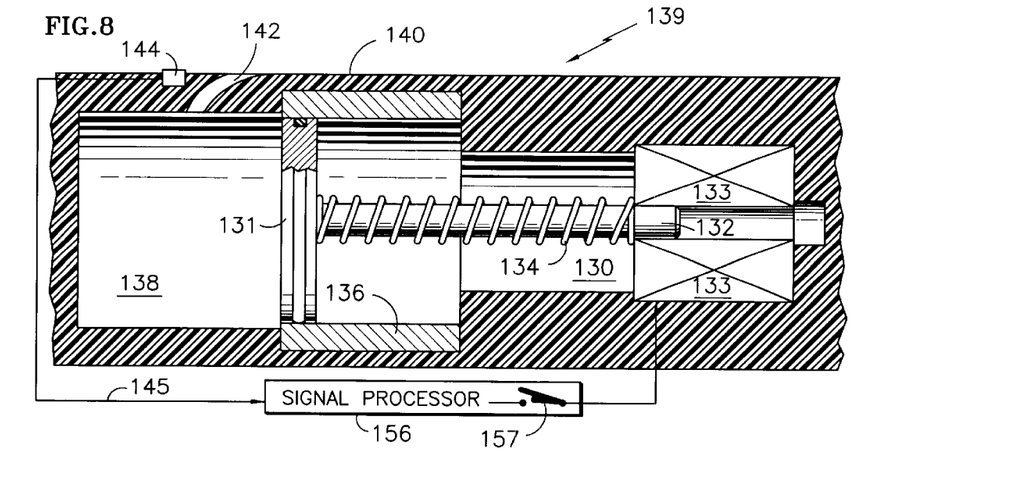
FIG. 8 is a partial, partially sectioned side elevation view of a passive synthetic jet having electroacoustic fluid pressure oscillation augmentation.

In the embodiments hereinbefore, it is assumed that the acoustic jets 18, 31, 31a are purely passive. However, they may be augmented by power drivers, if nozzle velocities higher than that achieved passively are desired. In FIG. 8, a fluidic pressure oscillation generator 130 comprises a piston 131 driven by a rod 132 which is alternately pulled to the left by a solenoid 133 or pushed to the right by a spring 134. The piston 131 slides within a cylinder 136 which is open to a chamber 138 formed within a structure 139 having a surface with an aerodynamic profile 140, and a tangentially oriented nozzle 142 of the invention. With the piston 131 statically positioned as shown, the chamber 138 and nozzle 142 form a passive acoustic jet of the type described hereinbefore. However, during particularly severe operating conditions of an associated fan or other apparatus, or otherwise, in the flow adjacent the surface 140, the pressure oscillations within the chamber 138 may be augmented by the piston 131. An exemplary way to achieve this includes sensing the pressure just upstream of the nozzle 142 on the surface 140 by means of a transducer 144, the output of which on a signal line 145 is applied to a signal processor 156 which may contain amplifiers and filters and the like, which in turn is utilized to drive the solenoid 133 with an appropriate phase so that the piston 131 will retract toward the solenoid 133 during high pressure portions of cyclic pressure variations at the nozzle 142, and will advance toward the chamber 138 during negative pressure portions of oscillatory pressure variations at the nozzle 142. When the severe condition subsides, operation of a function 157 within the signal processor can bring the piston 131 to rest in the position shown in FIG. 8 synchronously with the pressure waves at the nozzle 142, and thereafter the device will operate as a passive tangential acoustic jet, as described hereinbefore. Other electroacoustic devices may similarly be utilized so as to create the booster pressure oscillations for the passive/active tangential acoustic jet of the invention.

Figure 9:
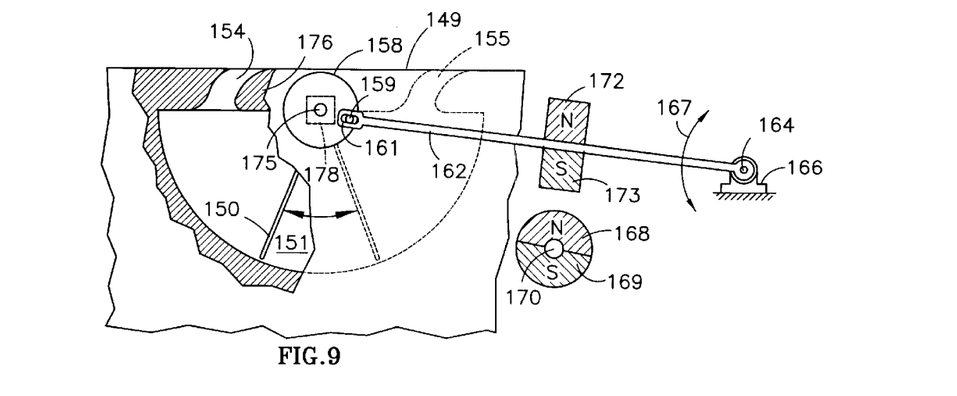
FIG. 9 is a partial, partially sectioned, side elevation view of a passive acoustic jet having mechanoacoustic fluid pressure oscillation augmentation.

Referring to FIG. 9, a mechanoacoustic gas pressure oscillation generator adjacent a surface 149 utilizes a paddle-like vane 150 oscillating within a chamber 151, between a position shown in solid lines and a position shown in dotted lines, to alternately provide an outstroke in a jet nozzle 154 and an instroke in a jet nozzle 155, as shown, and then provide the instroke to the nozzle 154 and the outstroke to the nozzle 155, when moving toward the position shown in dotted lines. The vane 150 is driven by a crank disk 158 which has a pin 159 engaging a slot 161 on a bell crank 162. The bell crank 162 is journaled by a pivot 164 in a fixed pillow block 166. The bell crank 162 will oscillate about the pivot 164 as shown by the arrow 167 in response to north pole and south pole magnets 168, 169 rotating on a shaft 170 which may be driven by the shaft of a fan or other apparatus with which the tangential acoustic jet of the invention is to be utilized. As the magnets 168, 169 rotate, they alternatively attract and repel north-pole and south-pole magnets 172, 173 disposed on the bell crank 162. In FIG. 9, the crank disk 158 is fixed to a shaft 175 with which it oscillates. The shaft 175 is resiliently journaled to the underlying structure 176, either by means of a torsional coil spring, or, preferably, by means of a Lucas Free-Flex® flexural pivot 178 which not only provide frictionless journaling, but also spring resistance to rotation either side of a median position. This provides resonant motion for greatest efficiency. The apparatus of FIG. 9 provides pulses of air tangentially through slot-shaped nozzles 154, 155 into a boundary layer flow, according to the invention. The apparatus described thus forms a pair of tangential acoustic jets of the invention within the structure 176 having a surface with a boundary layer. With the vane 150 centered (vertical as seen in FIG. 9) and the shaft 170 disengaged from any prime mover, the apparatus of FIG. 9 will operate as a pair of passive acoustic jets of the type described hereinbefore. The shaft 170 can be driven through a clutch to a prime mover related to the flow adjacent to the surface 149, such as any of the fans described hereinbefore, so as to augment the operation of the passive jet by driving the vane in a manner described hereinbefore, which will be synchronized to the pressure variations related to the prime mover. Other mechanoacoustic and electroacoustic devices may be utilized to provide pressure oscillations for augmenting the invention, such as other mechanical, electromechanical, electromagnetic, piezoelectric, or other mechanisms.

Figure 10:
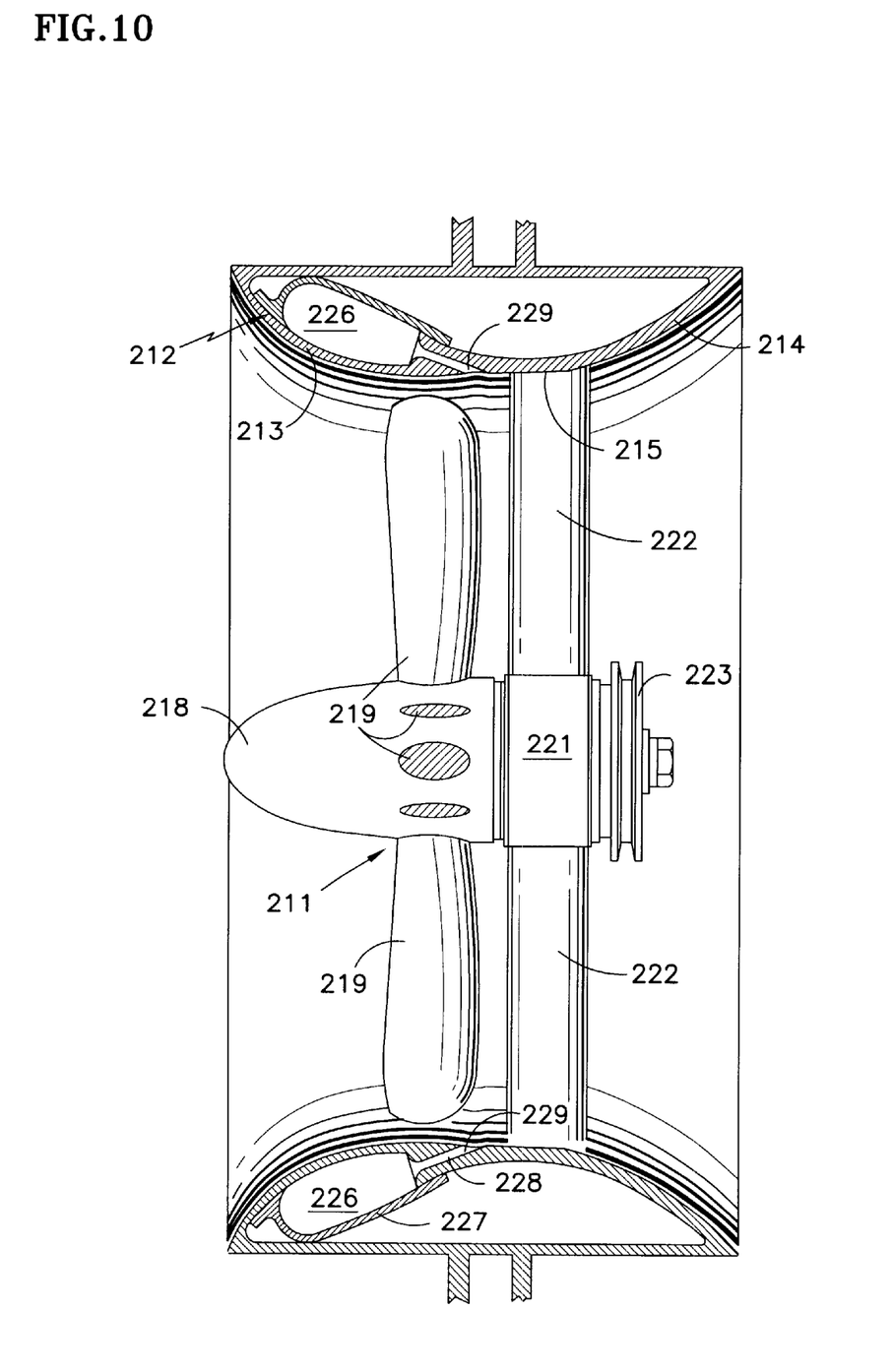
FIG. 10 is a partial, stylized, partially sectioned side elevation view of a vane axial fan feeding a diffuser, with a fixed wall embodiment of the invention.

Referring to FIG. 10, one embodiment of this invention is a vane axial fan 211 disposed within an inter-plenum shroud 212 which has converging section 213 and a diverging section 214 so as to form a throat 215. The fan is conventional, having a hub 218 with a plurality of blades 219 thereon, being suitably journaled to a hub 221 that supports flow-straightening vanes 222 (only two of which are shown, although more are typically used). The fan 211 may be driven in a conventional way, such as by means of a belt driving a pulley 223 or a hub-mounted motor (not shown). The fan 211 and its drive are irrelevant to the present invention, being an example merely of an airflow system which typically has sufficient noise to operate an acoustic jet according to the present invention, with the attendant advantage of consuming of the noise energy, and thereby causing the flow system to operate more quietly and improve system efficiency.

In accordance with the invention, a resonant acoustic chamber 226 is formed by a suitable shroud 227, the chamber having a neck 228 at an extreme acute angle with respect to the surface of the throat 215, with an orifice 229 formed in the end of the neck 228 at the surface of the throat 215 just upstream of the separation point. In the figure, the nozzles 229 are only shown in the upper and lower cross sections of the throat 215 for clarity. However, a plurality of separate chambers 226 with slot-shape nozzles, or strings of circular or other nozzles, will typically be used. The orifices 229 may also be located further downstream than the vicinity of the separation point. Additionally, passive acoustic synthetic jets may be disposed at more than one point along the flow, if necessary, so long as they are in the vicinity of high energy oscillatory pressure waves which can drive the synthetic jet.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fluid flow system, comprising:
   a fluid flow path having a surface and a stream of fluid flowing within said path, said fluid flow having a boundary layer adjacent said surface, said fluid flow having oscillatory pressure fluctuations;
   a passive acoustic chamber disposed near said surface; and
   a fluid passage interconnecting said chamber with said fluid flow path at a small acute angle with respect to said surface, said chamber and said passage forming a resonant, passive acoustic jet of which said passage forms a nozzle, the resonant frequency of said acoustic jet being selected so that said oscillatory pressure fluctuations at the resonant frequency of said acoustic jet are of sufficient strength to provide pulses of fluid particles into said boundary layer.

2. A system according to claim 1, wherein:
   said path includes a diffuser, said oscillatory pressure fluctuations being in the vicinity of the inlet of said diffuser; and
   said nozzle interconnects said chamber and said diffuser at a point in the vicinity of the boundary layer separation point of said diffuser.

3. A system according to claim 1 wherein:
   said passive acoustic chamber has fixed walls.

4. A system according to claim 1 wherein:
   said passive acoustic chamber has at least one flexible wall.

5. A system according to claim 1 wherein:
   said passive acoustic chamber has one moveable wall; and further comprising:
   powered means for moving said wall to augment operation of said passive synthetic jet.

6. A system according to claim 1 wherein said nozzle is directed into said flow at a small acute angle with respect to said surface to provide pulses of gas particles substantially tangentially into said boundary layer.

7. A system according to claim 1 wherein said fluid is gas.

8. A system according to claim 1 wherein:
   at least one wall of said chamber is moveable, the movement of which will provide fluid pressure components in said chamber; and further comprising:
   means synchronized with the pressure of fluid in said flow to move said one wall, whereby to augment passive operation of said synthetic jet.

9. A system according to claim 8 wherein:
   said means is an electromechanical transducer; and further comprising:
   a pressure sensor disposed to sense the pressure of said flow adjacent said surface; and
   a signal processor responsive to said pressure sensor to provide signals to said electromechanical transducer to operate said wall in synchronism with the pressure in said flow.

10. A system according to claim 9 wherein said signal processor includes means to s electively connect and disconnect said signals.

11. A system according to claim 8 wherein said flow is provided by a prime mover; and
   said means is a mechanical device driven by said prime mover.

12. A system according to claim 11 wherein said mechanical device is selectively disengaged from said prime mover.

13. A fluid flow system, comprising:
   a fluid flow path having a surface;
   a fluid flow prime mover disposed within said path for providing a stream of fluid flowing within said path, said fluid flow having a boundary layer adjacent said surface;
   said fluid flow having oscillatory pressure fluctuations in the vicinity of said prime mover;
   a resonant, passive acoustic chamber disposed near said surface; and
   a fluid passage interconnecting said chamber with said fluid flow path, said chamber and said passage forming a resonant, passive acoustic jet of which said passage forms a nozzle, the resonant frequency of said acoustic jet being selected so that said oscillatory pressure fluctuations at the resonant frequency of said acoustic jet are of sufficient strength to provide pulses of fluid particles into said boundary layer.

14. A system according to claim 13 wherein:
   said prime mover is an axial fan having blades;
   said path is within a shroud containing said fan; and
   said nozzle interconnects said chamber and said path at a point adjacent to the tips of the blades.

15. A system according to claim 14 wherein:
   said fan is the first stage of a gas turbine engine; and
   said air inlet is within a nacelle.

16. A system according to claim 14 wherein there are an integer number, N, passive acoustic jets per blade on said fan.

17. A system according to claim 16 wherein N=4.

18. A system according to claim 13 wherein:
   said primemover is an axial fan having blades;
   said path is within a shroud containing said fan; and said nozzle interconnects said chamber and said path at a point downstream of said fan.

19. A system according to claim 18 wherein:

said fan is part of air flow machinery and said air inlet is a plenum.

20. A system according to claim 13 wherein:

said prime mover includes rotating blades; and said oscillatory pressure fluctuations relate to a blade tip passage frequency of said prime mover.

21. A system according to claim 13 wherein said prime mover is a fan.

22. A system according to claim 21 wherein said prime mover is a vane-axial fan.

23. A system according to claim 21 wherein said prime mover is a centrifugal fan.

24. A system according to claim 23 wherein said centrifugal fan comprises:

a volute with a cutoff;

a bladed rotor for rotation within said volute;

a diffuser intersecting with said volute upstream of said cutoff;

said flow path being within said diffuser and said surface being a surface of said diffuser adjacent to the cutoff side of said volute.

25. A system according to claim 24 wherein:

one wall of said chamber includes a flexible wall of said volute downstream of said cutoff where the forcing amplitude of said pressure components is maximal; and said nozzle is located in said surface where the boundary layer energization is maximally effective.

26. A system according to claim 24 wherein said nozzle is located in said surface at a point between where the forcing amplitude of said pressure components is maximal and where the boundary layer energization is maximally effective.

* * * * *